Sept. 23, 1969                R. L. SMIRL                3,468,337
                        FLOW CONTROL VALVE ASSEMBLY
Filed Dec. 6, 1965                               3 Sheets-Sheet 2
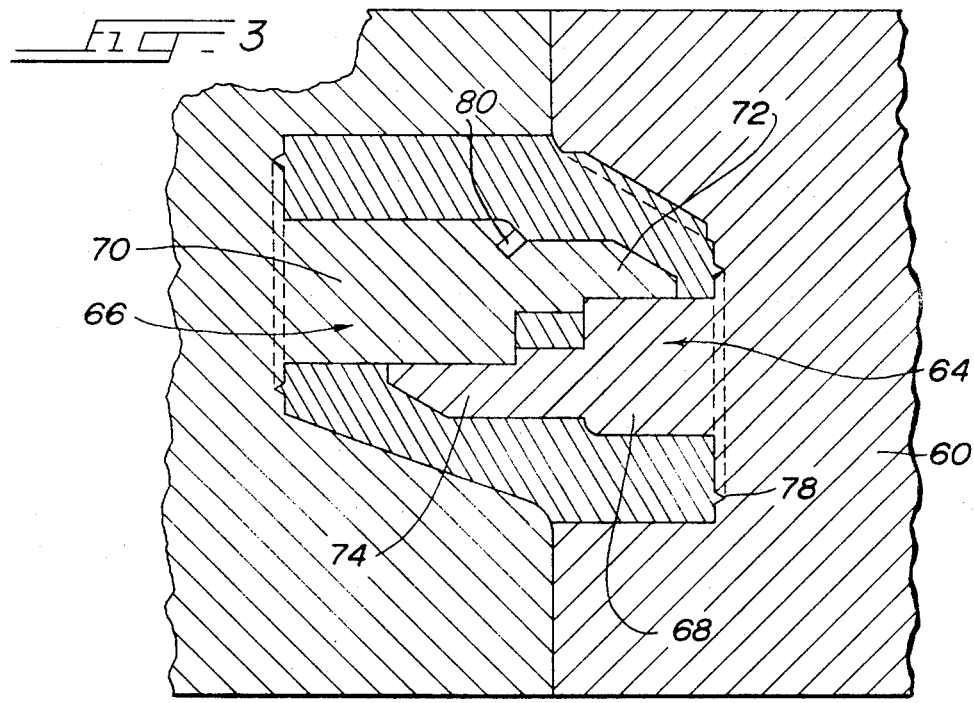
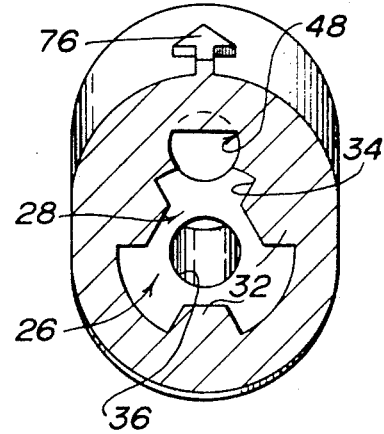
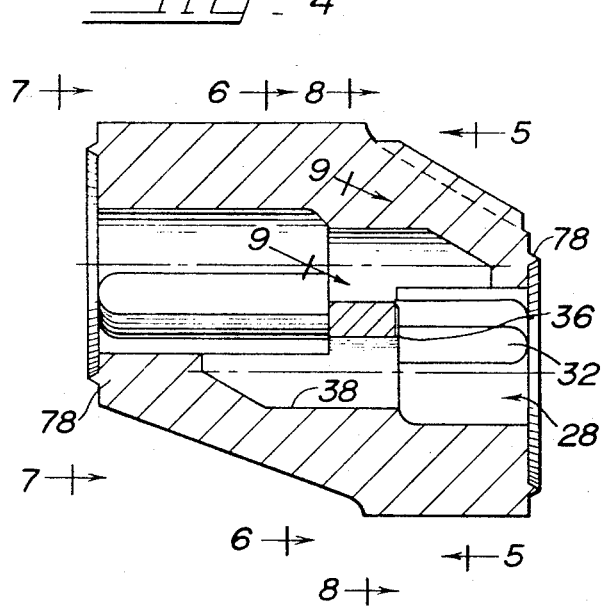
INVENTOR
RICHARD L. SMIRL
BY Joseph W. Malluck
ATTY.

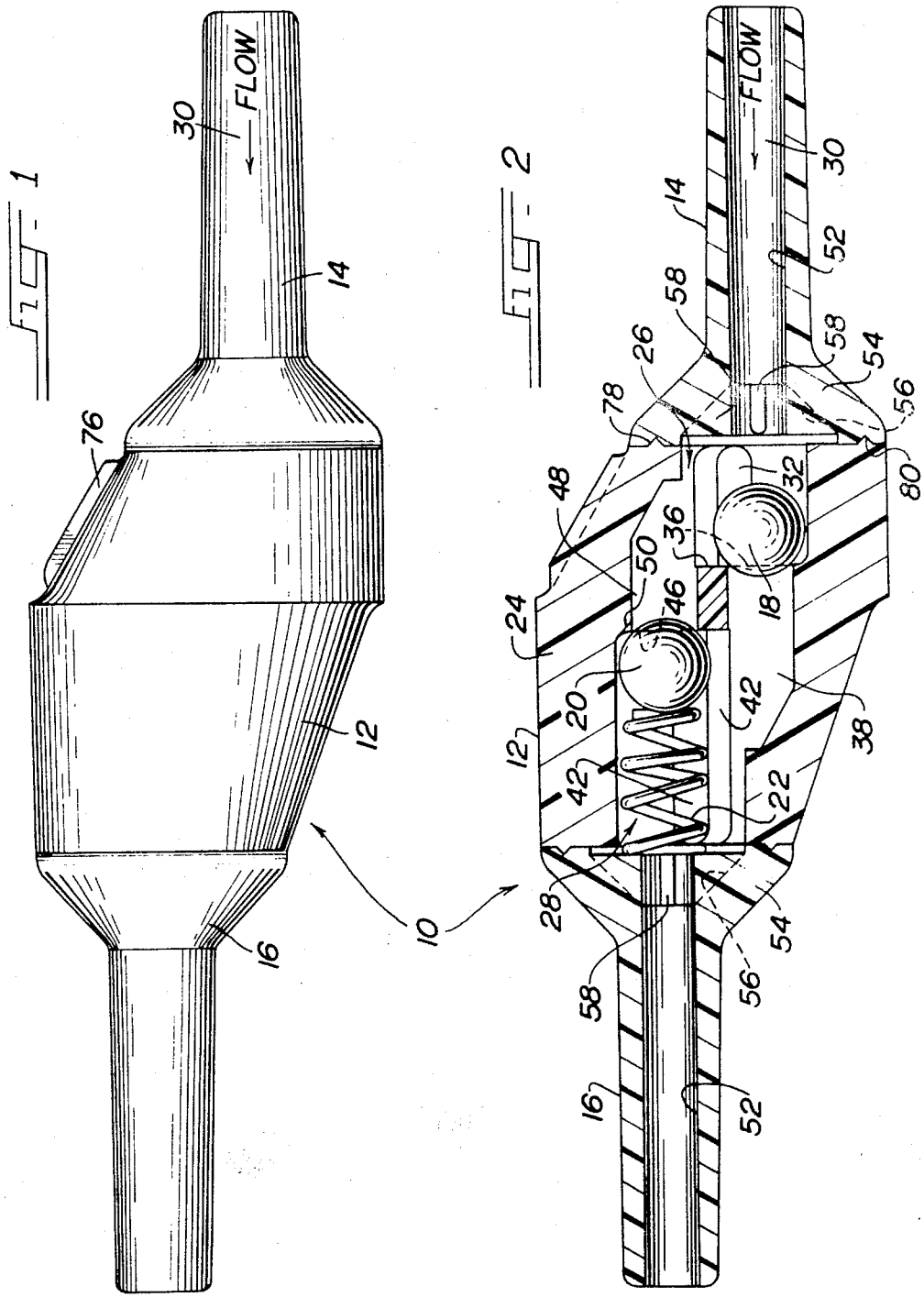

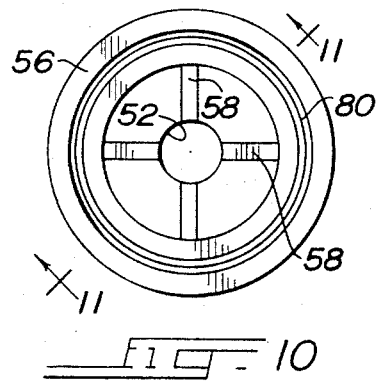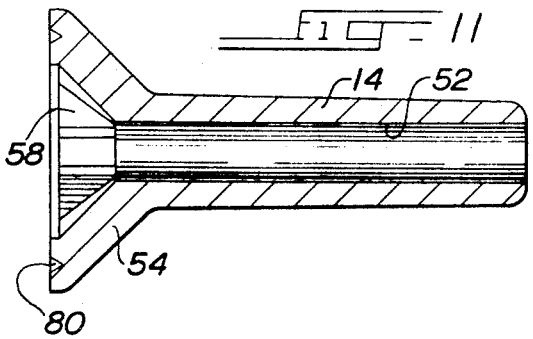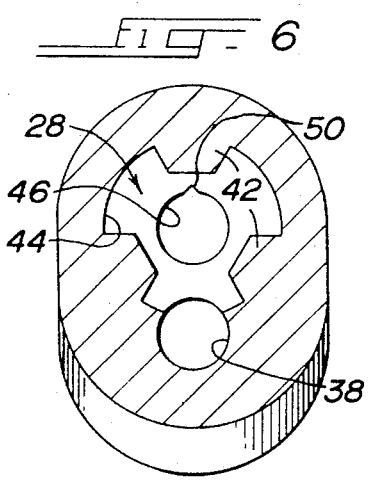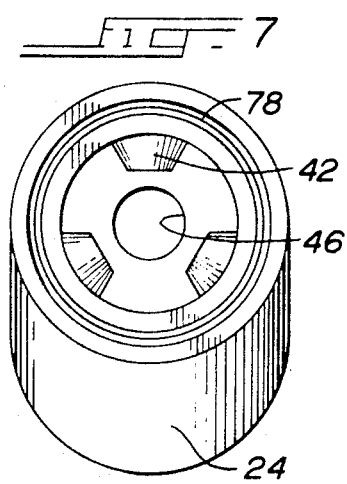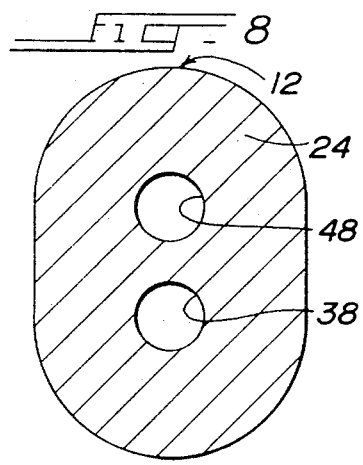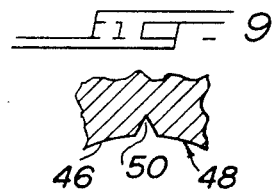
INVENTOR
RICHARD L. SMIRL

United States Patent Office 3,468,337
Patented Sept. 23, 1969

3,468,337
FLOW CONTROL VALVE ASSEMBLY
Richard L. Smirl, La Grange Park, Ill., assignor to Borg-Warner Corporation, Chicago, Ill., a corporation of Illinois
Filed Dec. 6, 1965, Ser. No. 511,772
Int. Cl. F16k *17/26, 15/00;* B21d *53/00*
U.S. Cl. 137—493.8                    7 Claims

ABSTRACT OF THE DISCLOSURE

A two stage control valve adapted to allow fluid flow through such valve at a predetermined low rate of flow in one direction when the fluid is below a predetermined pressure and to allow fluid flow at a predetermined higher rate of flow in the same direction when the fluid is above said predetermined pressure, the valve further being adapted to allow unrestricted flow in the opposite direction.

---

The present invention relates to a flow control valve.

A broad object of the invention is to provide a novel valve for controlling the flow of fluid in one direction while permitting free flow thereof in the opposite direction.

Another object is to provide a valve of the character referred to, in which the flow of fluid in the first direction is so controlled that it will flow at a predetermined low rate under low pressure of the fluid, and a much greater rate under a predetermined greater pressure of the fluid.

Still another object is to provide a flow control valve of the foregoing character which utilizes ball closers in both directions, and which is extremely compact, thereby eliminating long throw of the closer.

Another object is to provide a flow control valve of the foregoing general character which is of extremely simple construction, made up of a small number of parts, which can be easily molded, and which requires no machining, resulting in an extremely inexpensive item, and one that is unusually effective.

Other objects and advantages of the invention will appear from the following detail description taken in conjunction with the accompanying drawings wherein:

FIGURE 1 is a side elevational view of a valve made according to the present invention;

FIGURE 2 is an axial sectional view thereof, oriented according to FIGURE 1 and showing a plastic construction;

FIGURE 3 is an axial sectional view of the body member of the valve, in the mold in which it is made;

FIGURE 4 is an axially sectional view of the body member of the valve;

FIGURE 5 is a sectional view taken at line 5—5 of FIGURE 4;

FIGURE 6 is a sectional view taken at line 6—6 of FIGURE 4;

FIGURE 7 is a sectional view taken at line 7—7 of FIGURE 4;

FIGURE 8 is a sectional view taken at line 8—8 of FIGURE 4; and

FIGURE 9 is a sectional view of a detail of the valve body taken at line 9—9 of FIGURE 4.

FIGURE 10 is an end view of the inlet fitting.

FIGURE 11 is a sectional view taken at line 11—11 of FIGURE 10.

Referring now in detail to the drawings, attention is directed first to FIGURES 1 and 2 where the valve in its entirety is represented. The valve indicated in its entirety at 10 is made up of a total of six parts, namely, a body 12, an inlet fitting 14, an outlet fitting 16, which is identical in construction to the inlet fitting, two valve closer balls 18 and 20 which are also identical, and a compression spring 22. Since the end fittings 14 and 16 are identical, and the balls 18 and 20 are identical, the valve is made up of only four different kinds of parts.

The body 12 and the end fittings 14 and 16 may be molded or die cast and may be made, for example, of nylon plastic or other suitable materials. The valve is adapted for use in connection with any of a wide variety of liquids and gases.

Referring in detail to the body 12, this member includes a surrounding wall 24 of generally tubular shape having an inlet port 26 and an outlet port 28. These ports are so identified according to the normal flow of fluid through the valve which is indicated by the arrow 30, although the fluid may at times flow in the reverse direction. The inlet port 26 is provided with a plurality of preferably three ribs or flutes 32 defining a cage for confining the closer ball 18, between which are grooves 34 (FIGURE 5) for enabling the free flow of fluid past the ball.

The ball 18 is adapted to seat against a seat 36 at the end of a reduced diameter passage 38 forming a continuation of the port 26, and communicating therewith when the ball is removed from the seat, and being shut off therefrom when the ball is seated against the seat.

The outlet port 28 is similar in all material respects to the inlet port 26, but preferably is of greater axial length. This port is provided with a plurality of preferably three ribs or flutes 42 (see also FIGURE 6) forming a cage for confining the closer ball 20. These flutes provide grooves 44 therebetween for the free flow of fluid around the ball.

The compression spring 22 is confined between the outlet end fitting 16 and the ball 20 for biasing the ball into engagement with a seat 46 of reduced dimension relative to the port 28, and between that port and a reduced diameter passage 48 which communicates with the port 26. The body 12 is thus provided with two passages therethrough which have free-flow communiction with each other when the valve closer balls are unseated, a first passage which may now be identified as an inlet passage which includes the port 26, the reduced passage 48 and the port 28, while the other passage now identified as the reverse passage is formed by the port 28, the reduced passage 38, and the port 26.

A notch 50 is molded into the seat 46 (FIGURES 2 and 9) in by-passing relation to the closer ball 20 when the latter is seated against the seat. This notch forms a relatively small orifice for the restricted flow of fluid through the valve in inlet direction and when the ball 20 is seated. This notch is of the desired dimensions according to the intended rate of flow of fluid when the ball 20 is seated.

Each of the end fittings, 14 and 16, includes a passage 52 of the desired diameter for accommodating the intended rate of flow of fluid under maximum flow conditions. Each fitting is provided with a conical extension 54 having a conical cavity 56 forming an enlarged continuation of the conduit 54 and communicating directly with the corresponding port 26 or 28. The cavity 56 is provided with a plurality of, such as four, radial ribs 58 which in the case of the inlet fitting 14 are engageable by the closer ball 18 when the latter moves in opening direction, enabling free flow of fluid around the ball in reverse flow direction. In the case of the outlet end fitting 16, the ribs 58 provide a seat for engagement by the compression spring 22.

The valve is interposed in a fluid line which is to be controlled, and in the normal operation thereof, the fluid flows therethrough in inlet direction as indicated by the arrow 30, which in FIGURES 1 and 2 is from right to left. The fluid readily seats the closer ball 18 against its seat and the fluid flows throuhg the port 26 and freely into the reduced passage 48. The fluid then flows through the notch 50 at a restricted rate and so long as the pressure of the fluid remains below a predetermined value, the compression spring 22 retains the ball 20 against its seat 46. When, however, a substantially greater pressure of the fluid is developed, and a presure greater than the effective strength of the spring 22, the fluid unseats the ball 20 and establishes free-flow communication from the reduced passage 48 into the port 28, and under such higher pressure great quantities of fluid are, of course, accommodated.

The valve permits free flow of fluid in the reverse direction. In such reverse flow of fluid, it readily unseats the closer ball 18 and permits free flow of the fluid from the reduced passage 38 into the port 26 without restriction. A slight amount of fluid may, of course, also flow through the notch 50, but this in inconsequential in view of the free-flow through the passage 38.

The capacity and strength of the spring 22 are preselected for controlling the fluid according to the pressure thereof. For example, the spring is selected so as to yield upon the pressure of the fluid reaching a predetermined value; the pressure of the fluid can fluctuate within any range below that pressure, and the closer ball 20 remains seated, but upon the pressure of the fluid exceeding that predetermined value, the ball is unseated, and the fluid then flows unrestrictedly. Thus, a two-stagte control of the fluid is effected, for flow of the fluid in one direction, while it is permitted free-flow in the opposite direction.

The valve, in addition to its effectiveness, is exteremely inexpensive. It is of simple construction, being made of a small number of parts—six, and only four different kinds of parts, and none of the parts require machining in the manufacture thereof. The body can be easily molded as represented in FIGURE 3, which shows two mold parts 60 and 62 having integral cores 64 and 66. These cores have large portions 68 and 70 and small extensions 72 and 74, the large portions forming the ports 26 and 28, while the reduced extensions form the reduced passages 48 and 38. The design is so simplified that the reduced extensions overlap and engage the large portions, rendering the cores of extremely simple design while providing the desired sizes and shapes of the passages through the body. If desired, an arrow 76 may be molded or cast on the exterior surface of the body to indicate the direction of normal flow of fluid through the valve.

The end fittings 14 and 16 may also be cast or molded by simple processes, as will be understood. The body is provided with annular rings 78 around the ports and the end fittings with annular grooves 80 of corresponding shape, which is preferably V-shaped. These end fittings are applied to the body by a spin weld operation, in the case of plastic material, and no other securing means are required.

Neither the body nor any other parts require any machining operations, such as on the seats 36, 46, the balls 18 and 20 effectively closing the seats. The use of balls may be used in a modified form where they would be free flowing (no springs); the choice of balls as valve members is preferable since they present the same seating surface in any attitude and are easier to properly guide. The valve is extremely compact, of minimum length axially, the balls permitting free flow of fluid therepast when only a short distance removed from the seats.

I claim:

1. A valve including a body having an inlet port and an outlet port and a pair of divided passages interconnecting the ports each passage having a first portion leading immediately inwardly from the port and an extended second portion therebeyond, said ports and passages being off-set transverse to their respective axes and the second portion of each passage overlying the first portion of the opposite passage and communicating throughout a substantial area for free flow of fluid between the passage; seats in the passages facing in opposite directions; a closer for each seat comprising a ball arranged for rolling in a corresponding passage a first seat and closer so shaped that when said closer engages said seat the corresponding passage is entirely closed; a second seat and closer and a resilient member utilized for biasing said closer into engagement with said second seat, said second seat and closer so shaped when the closer engages the seat a relatively small orifice is formed therebetween and when separated from the seat a large orifice is formed therebetween, said valve adapted for connection with a first conduit and a second conduit, said closers operative for enabling flow of fluid therethrough in a direction from said inlet port to said outlet port at a first restricted rate under low fluid pressure and at second substantially greater rate under predetermined greater fluid pressure and enabling free flow in a direction from said outlet port to said inlet port for all operating fluid pressures.

2. The invention set out in claim 1 wherein said second seat defines a notch therein which remains open when the closer is seated against the seat, said notch forming a fixed orifice when the closer is seated.

3. The invention set out in claim 1 wherein each passage has a relatively large portion leading inwardly from the corresponding port and a reduced extension leading therebeyond and communicating freely with the relatively large portion of the other passage, the seats are formed between the large and small portions of the passages, and the balls are arranged for free rolling action in the large portions of the passages, the large portions having ribs defining cages for the balls and forming grooves therebetween for enabling free flow of fluid therein around the balls.

4. The invention set out in claim 1 wherein the valve includes end fittings secured to each end of the valve body and having a conduit communicating with the respective port, said end fittings being adapted for communication with elements of a fluid line.

5. The invention set out in claim 4 wherein the body and end fittings are made of plastic material, the end fittings have conical extensions fitted to the body with the conduits therein in register with the ports in the body, the body and the end fittings having annular interlocking formations surrounding the ports and conduits.

6. A valve adapted for connection with a first conduit and a second conduit including means operative for enabling flow of fluid therethrough in a direction from said first conduit to said second conduit at a first restricted rate under low fluid pressure and at a second substantially greater rate under predetermined greater fluid pressure and enbaling free flow in a direction from said second conduit to said first conduit for all operating fluid pressures, said valve including a body having a port at each end and a passage leading inwardly from each port, each passage has a large portion leading immediately inwardly from the port and an extended reduced portion therebeyond, said ports and passages being off-set transverse to their respective axes and the reduced portion of each passage overlying the large portion of the opposite passage and communicating throughout a substantial area for free flow of fluid between the passages, each passage progressing inwardly from its port and at all points therealong being of no greater dimension than at any point closer to the port.

7. A two-stage flow control valve adapted to be connected to a first conduit and a second conduit, the valve including a valve body having an inlet port and an outlet port and a pair of divided passages interconnecting the ports consisting of a first passage associated with said inlet port and a second passage associated with said outlet port, each passage having a first portion leading immediately inwardly from the port and an extended second portion therebeyond, said ports and said passages being off-set transverse to their respective axes and the second portion of each passage overlying the first portion of the opposite passage and communicating throughout a substantial area for free flow of fluid between the passages, a ball closer disposed within said second passage; valve seating means in said second passage effective to seat said ball closer in a partial seating engagement; biasing means associated with said ball closer effective to urge said ball closer into partial seating engagement with said valve seating means, said ball and said ball seating means cooperative to define an orifice allowing a first predetermined limited flow therethrough when fluid is communicated at a low pressure from said inlet port to said outlet port, said orifice adapted to allow a second predetermined greater flow therethrough when fluid is communicated from said inlet port to said outlet port at a pressure in excess of said predetermined pressure; ball closer means slidably positioned in said first passage cooperative to assume one of at least two positions depending on the direction of fluid flow, said ball closer assuming said first position for the flow of fluid from said inlet port to said outlet port said ball closer operative in said first position to block communication from said first passage to said second passage and said ball closer assuming said second position for the flow of fluid from said outlet port to said inlet port said ball closer operative in said second position to allow unrestricted flow from said outlet port to said inlet port.

References Cited

UNITED STATES PATENTS

| | | | |
|---|---|---|---|
| 1,923,127 | 8/1933 | Veenschoten | 137—493.8 X |
| 2,159,289 | 5/1939 | Nickelsen | 137—493.8 |
| 2,226,022 | 12/1940 | Shutts | 137—493.8 X |
| 3,190,284 | 6/1965 | Koepf | 137—513.5 X |

ARNOLD ROSENTHAL, Primary Examiner

U.S. Cl. X.R.

29—157.1; 137—513.5